(12) United States Patent
Tokunaga et al.

(10) Patent No.: US 11,897,812 B2
(45) Date of Patent: *Feb. 13, 2024

(54) ALKALI-FREE GLASS

(71) Applicant: AGC Inc., Tokyo (JP)

(72) Inventors: Hirofumi Tokunaga, Tokyo (JP); Kazutaka Ono, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,443

(22) Filed: Jul. 8, 2022

(65) Prior Publication Data

US 2022/0340477 A1 Oct. 27, 2022

Related U.S. Application Data

(63) Continuation of application No. 17/017,891, filed on Sep. 11, 2020, now Pat. No. 11,414,339, which is a continuation of application No. PCT/JP2019/010425, filed on Mar. 13, 2019.

(30) Foreign Application Priority Data

Mar. 14, 2018 (JP) ................. 2018-046960

(51) Int. Cl.
  *C03C 3/087* (2006.01)
  *C03C 3/091* (2006.01)

(52) U.S. Cl.
  CPC ............. *C03C 3/087* (2013.01); *C03C 3/091* (2013.01); *C03C 2201/10* (2013.01); *C03C 2203/10* (2013.01)

(58) Field of Classification Search
  CPC .................................................. C03C 3/091
  See application file for complete search history.

(56) References Cited

U.S. PATENT DOCUMENTS

| | | | |
|---|---|---|---|
| 9,382,152 B2 | 7/2016 | Tokunaga | |
| 9,540,273 B2 | 1/2017 | Tokunaga | |
| 11,053,160 B2 | 7/2021 | Tokunaga | |
| 11,414,339 B2 * | 8/2022 | Tokunaga | ................ G11B 5/73 |
| 2012/0149544 A1 | 6/2012 | Nagai et al. | |
| 2013/0274086 A1 | 10/2013 | Tsujimura et al. | |
| 2014/0366581 A1 | 12/2014 | Tokunaga | |
| 2015/0045203 A1 | 2/2015 | Tokunaga et al. | |
| 2015/0072130 A1 | 3/2015 | Tokunaga | |
| 2015/0087495 A1 | 3/2015 | Nishizawa et al. | |
| 2016/0002095 A1 | 1/2016 | Tsujimura et al. | |
| 2016/0068427 A1 | 3/2016 | Tokunaga et al. | |
| 2019/0047899 A1 | 2/2019 | Tokunaga et al. | |
| 2019/0185368 A1 | 6/2019 | Tokunaga | |

FOREIGN PATENT DOCUMENTS

| | | |
|---|---|---|
| JP | 2015-28827 A | 2/2015 |
| JP | 5702888 B2 | 4/2015 |
| JP | 5712922 B2 | 5/2015 |
| JP | 5849965 B2 | 2/2016 |
| TW | 201739713 A | 11/2017 |
| WO | WO 2013/183626 A1 | 12/2013 |
| WO | WO 2019/177069 A1 | 9/2019 |

OTHER PUBLICATIONS

International Search Report dated May 28, 2019 in PCT/2019/010425 filed on Mar. 13, 2019, 2 pages.

* cited by examiner

*Primary Examiner* — Karl E Group
(74) *Attorney, Agent, or Firm* — Oblon, McClelland, Maier & Neustadt, L.L.P.

(57) ABSTRACT

An alkali free glass has an average coefficient of thermal expansion at 50 to 350° C. of $30\times10^{-7}$ to $43\times10^{-7}/°$ C., a Young's modulus of 88 GPa or more, a strain point of 650 to 725° C., a temperature $T_4$ at which a viscosity reaches $10^4$ dPa·s of 1,290° C. or lower, a glass surface devitrification temperature ($T_c$) of $T_4+20°$ C. or lower, and a temperature $T_2$ at which the viscosity reaches $10^2$ dPa·s of 1,680° C. or lower. The alkali free glass contains, as represented by mol % based on oxides, 62 to 67% of $SiO_2$, 12.5 to 16.5% of $Al_2O_3$, 0 to 3% of $B_2O_3$, 8 to 13% of MgO, 6 to 12% of CaO, 0.5 to 4% of SrO, and 0 to 0.5% of BaO. MgO+CaO+SrO+BaO is 18 to 22%, and MgO/CaO is 0.8 to 1.33.

18 Claims, No Drawings

ALKALI-FREE GLASS

CROSS-REFERENCE TO RELATED APPLICATIONS

The present application is a continuation of U.S. patent application Ser. No. 17/017,891 filed on Sep. 11, 2020, which is a continuation of International Application No. PCT/JP2019/010425 filed on Mar. 13, 2019, and claims priority to Japanese Patent Application No. 2018-46960 filed on Mar. 14, 2018. The entire disclosures of all of which are incorporated herein by reference.

TECHNICAL FIELD

The present invention relates to an alkali free glass suitable as a glass substrate for various displays, photomasks, electronic device supports, information recording media, planar antennas, etc.

BACKGROUND ART

A glass to be used as a glass sheet (glass substrate) for various displays, photomasks, electronic device supports, information recording media, planar antennas, etc., particularly a glass to be used as a glass sheet on which a thin film of metal, oxide or the like should be formed on its surface is required to have the following characteristics (1) to (4) and so on.
(1) When the glass contains alkali metal oxide, the glass should contain substantially no alkali metal ion that may be diffused into the thin film to thereby deteriorate the film properties of the thin film.
(2) The glass should have a strain point high enough to minimize deformation of the glass sheet and contraction (thermal contraction) caused by structural stabilization of the glass when the glass sheet is exposed to high temperature in a step of forming the thin film.
(3) The glass should have enough chemical durability against various chemicals used for forming a semiconductor. Particularly the glass should have durability against alkali such as buffered hydrofluoric acid (BHF: liquid mixture of hydrofluoric acid and ammonium fluoride) used for etching $SiO_x$ or $SiN_x$, chemical liquid containing hydrochloric acid used for etching ITO, various acids (such as nitric acid, sulfuric acid, etc.) used for etching metal electrodes, and alkali of resist peeling liquid.
(4) The glass should have no defects (bubbles, striae, inclusions, pits, scratches, etc.) inside the glass and in the surface of the glass.

In addition to the aforementioned requirements, the following characteristics are also required in recent years.
(5) The glass should have a small specific weight due to a request to reduce the weight of a display.
(6) The glass sheet should be thinned due to the request to reduce the weight of the display.
(7) The glass should have heat resistance to manufacture a polycrystal silicon (p-Si) type liquid crystal display high in heat treatment temperature as well as a conventional amorphous silicon (a-Si) type liquid crystal display (heat treatment temperature of a-Si: about 350° C., heat treatment temperature of p-Si: 350 to 550° C.).
(8) The glass should have a small average coefficient of thermal expansion in order to increase a temperature increase/increase rate in thermal treatment for manufacturing the liquid crystal display to thereby increase the productivity or to increase the thermal shock resistance. On the other hand, when the average coefficient of thermal expansion of the glass is too small, the number of steps of forming various films such as a gate metal film and a gate insulating film in manufacturing of the liquid crystal display may increase to increase the warpage of the glass. Thus, defects such as cracks or scratches may occur when the liquid crystal display is being conveyed, causing a problem such as increase in misalignment of an exposure pattern.
(9) The glass should have a high specific elastic modulus (Young's modulus/density) in accordance with increase in size and reduction in sheet thickness of the glass substrate.

In order to satisfy the aforementioned requirements, various glass compositions have been, for example, proposed in glasses for liquid crystal display panels (see Patent Literatures 1 to 4).

CITATION LIST

Patent Literature

Patent Literature 1: Japanese Patent No. 5702888
Patent Literature 2: WO 2013/183626
Patent Literature 3: Japanese Patent No. 5849965
Patent Literature 4: Japanese Patent No. 5712922

SUMMARY OF INVENTION

Technical Problem

Resolution has been made higher and higher in recent electronic displays. In a large-sized television, for example, film thickness of Cu wiring has increased in accordance with higher definition thereof. For such a reason, warpage in a substrate tends to increase due to formation of various films. Therefore, to answer increasing needs for substrates with reduced warpage, it is necessary to increase the Young's modulus of a glass.

However, a known glass having a high Young's modulus as described in Patent Literature 3 or 4 has a high strain point and tends to have a high devitrification temperature as compared with a temperature $T_4$ at which viscosity reaches $10^4$ dPa·s. As a result, the glass cannot be formed easily, so that a load on manufacturing facilities increases. Thus, there is concern that the production cost may increase.

An object of the present invention is to provide a glass capable of inhibiting deformation such as warpage in a glass substrate, excellent in formability, and low in load on manufacturing facilities.

Solution to Problem

In order to attain the foregoing object, an alkali free glass according to the present invention has an average coefficient of thermal expansion at 50 to 350° C. of $30 \times 10^{-7}$ to $43 \times 10^{-7}$/° C., a Young's modulus of 88 GPa or more, a strain point of 650 to 725° C., a temperature $T_4$ at which viscosity reaches $10^4$ dPa·s of 1,290° C. or lower, a glass surface devitrification temperature ($T_c$) of $T_4+20°$ C. or lower, and a temperature $T_2$ of 1,680° C. or lower at which the viscosity reaches $10^2$ dPa·s, and contains, as represented by mol % based on oxides,
62 to 67% of $SiO_2$,
12.5 to 16.5% of $Al_2O_3$,
0 to 3% of $B_2O_3$,
8 to 13% of MgO,
6 to 12% of CaO,
0.5 to 4% of SrO, and 0 to 0.5% of BaO, wherein MgO+CaO+SrO+BaO is 18 to 22%, and MgO/CaO is 0.8 to 1.33.

In another configuration of the alkali free glass according to the present invention, specific elastic modulus may be 34 MN·m/kg or higher.

In another configuration of the alkali free glass according to the present invention, density may be 2.60 g/cm³ or lower.

In another configuration of the alkali free glass according to the present invention, glass surface devitrification viscosity ($\eta_c$) may be $10^{3.8}$ dPa·s or higher.

In another configuration of the alkali free glass according to the present invention, a glass transition temperature may be 730 to 790° C.

In another configuration of the alkali free glass according to the present invention, a value expressed by the following Expression (I) may be 4.10 or more.

$$(7.87[Al_2O_3]-8.5[B_2O_3]+11.35[MgO]+7.09[CaO]+5.52[SrO]-1.45[BaO])/[SiO_2] \quad \text{Expression (I)}$$

In another configuration of the alkali free glass according to the present invention, a value expressed by the following Expression (II) may be 0.95 or more.

$$(-1.02[Al_2O_3]+10.79[B_2O_3]+2.84[MgO]+4.12[CaO]+5.19[SrO]+3.16[BaO])/[SiO_2] \quad \text{Expression (II)}$$

In another configuration of the alkali free glass according to the present invention, a value expressed by the following Expression (III) may be 5.5 or less.

$$(8.9[Al_2O_3]+4.26[B_2O_3]+11.3[MgO]+4.54[CaO]+0.1[SrO]-9.98[BaO])\times\{1+([MgO]/[CaO]-1)^2\}/[SiO_2] \quad \text{Expression (III)}$$

In another configuration of the alkali free glass according to the present invention, the glass may contain 0.5% or lower of $SnO_2$ as represented by mol % based on oxides.

In another configuration of the alkali free glass according to the present invention, a β-OH value may be 0.05 to 0.5 mm⁻¹.

In another configuration of the alkali free glass according to the present invention, compaction may be 100 ppm or lower.

In another configuration of the alkali free glass according to the present invention, an equivalent cooling rate may be 5 to 500° C./min.

In another configuration of the alkali free glass according to the present invention, the glass may be a glass sheet having at least one side of 1,800 mm or longer and a thickness of 0.7 mm or less.

In another configuration of the alkali free glass according to the present invention, the glass may be manufactured by a float process or a fusion process.

In addition, a display panel according to the present invention includes an alkali free glass according to the present invention.

In addition, a semiconductor device according to the present invention includes an alkali free glass according to the present invention.

In addition, an information recording medium according to the present invention includes an alkali free glass according to the present invention.

In addition, a planar antenna according to the present invention includes an alkali free glass according to the present invention.

Advantageous Effects of Invention

According to the present invention, it is possible to provide a glass capable of inhibiting deformation such as warpage in a glass substrate, excellent in formability, and low in load on manufacturing facilities.

DESCRIPTION OF EMBODIMENT

An embodiment of the present invention is described below. The present invention is not limited to the embodiment which is described below.

In the following description, a composition range of each component of a glass is expressed by mol % based on oxides.

In the following description, a numerical range expressed by "numerical value A to numerical value B" designates a range including the numerical value A and the numerical value B as a minimum value and a maximum value of the range respectively, and means that the range is not less than the numerical value A and not more than the numerical value B.

First, a composition of an alkali free glass according to the embodiment is described.

When the content of $SiO_2$ is lower than 62 mol % (hereinafter referred to as % simply), there is a tendency that the strain point of the glass does not increase sufficiently while the average coefficient of thermal expansion thereof increases and the specific weight thereof increases. Therefore, the content of $SiO_2$ is 62% or higher, preferably 62.5% or higher, more preferably 63% or higher, particularly preferably 63.5% or higher, and most preferably 64% or higher.

When the content of $SiO_2$ exceeds 67%, there is a tendency that the meltability of the glass decreases and the Young's modulus thereof decreases while the devitrification temperature thereof increases. Therefore, the content of $SiO_2$ is 67% or lower, preferably 66.5% or lower, more preferably 66% or lower, and particularly preferably 65.7% or lower.

$Al_2O_3$ increases the Young's modulus to inhibit deflection, inhibits phase separation of the glass, and improves a fracture toughness value to increase glass strength. When the content of $Al_2O_3$ is lower than 12.5%, those effects do not appear easily. In addition, other components increasing the average coefficient of thermal expansion increase relatively. As a result, the average coefficient of thermal expansion tends to increase. Therefore, the content of $Al_2O_3$ is 12.5% or higher, preferably 12.8% or higher, and more preferably 13% or higher.

When the content of $Al_2O_3$ exceeds 16.5%, the meltability of the glass deteriorates, the strain point increases, and the devitrification temperature may increase. Therefore, the content of $Al_2O_3$ is 16.5% or lower, preferably 16% or lower, more preferably 15.7% or lower, even more preferably 15% or lower, particularly preferably 14.5% or lower, and most preferably 14% or lower.

$B_2O_3$ is not an essential component. However, $B_2O_3$ improves resistance to BHF, improves melting reaction of the glass and decreases the devitrification temperature. Therefore, $B_2O_3$ may be contained by 3% or lower. The content of $B_2O_3$ is 3% or lower, preferably 2.5% or lower, more preferably 2.2% or lower, even more preferably 2% or lower, particularly preferably 1.7% or lower, and most preferably 1.5% or lower.

MgO increases the Young's modulus without increasing the specific weight, so that MgO can increase the specific elastic modulus to thereby inhibit deflection. In addition, MgO improves the fracture toughness value to increase the glass strength. Further, MgO also improves the meltability. When the content of MgO is lower than 8%, those effects do not appear easily. In addition, the coefficient of thermal expansion may be too low. Therefore, the content of MgO is 8% or higher, preferably 8.2% or higher, and more preferably 8.5% or higher.

On the contrary, when the content of MgO is too high, the devitrification temperature tends to increase. Therefore, the content of MgO is 13% or lower, preferably 12% or lower, more preferably 11% or lower, even more preferably 10.5% or lower, particularly preferably 10% or lower, and most preferably 9.7% or lower.

CaO is characterized by increasing the specific elastic modulus next to MgO among alkali earth metals, and preventing the strain point from decreasing excessively. CaO also improves the meltability in the same manner as MgO. Further, CaO is also characterized by making the devitrification temperature not higher than MgO does. When the content of CaO is lower than 6%, those effects do not appear easily. Therefore, the content of CaO is 6% or higher, preferably 7% or higher, more preferably 8% or higher, and even more preferably 9% or higher.

When the content of CaO exceeds 12%, the average coefficient of thermal expansion becomes too high, and the devitrification temperature increases to devitrify the glass easily during the manufacturing of the glass. Therefore, the content of CaO is 12% or lower, preferably 11% or lower, and more preferably 10% or lower.

SrO improves the meltability without increasing the devitrification temperature of the glass. However, when the content of SrO is lower than 0.5%, those effects do not appear easily. Therefore, the content of SrO is 0.5% or higher, preferably 1% or higher, more preferably 1.2% or higher, and even more preferably 1.5% or higher.

The aforementioned effects in SrO are lower than those in BaO. When the content of SrO increases excessively, an effect of increasing the specific weight surpasses those effects, and the average coefficient of thermal expansion may also increase excessively. Therefore, the content of SrO is 4% or lower, preferably 3% or lower, more preferably 2.5% or lower, and even more preferably 2% or lower.

BaO is not an essential component. However, BaO improves the meltability without increasing the devitrification temperature of the glass. Therefore, BaO may be contained in the alkali free glass of the embodiment. However, when the content of BaO is excessive, there is a tendency that the specific weight increases, the Young's modulus decreases, and the average coefficient of thermal expansion increases excessively. Therefore, the content of BaO is 0.5% or lower. More preferably in the glass in the embodiment, BaO is substantially not contained.

The phrase "substantially not contained" designates that a component is not contained but as impurities mixed from raw materials or the like, that is, not contained intentionally. In the embodiment, when BaO is substantially not contained, the content of BaO is, for example, 0.3% or lower, preferably 0.2% or lower, more preferably 0.1% or lower, even more preferably 0.05% or lower, and particularly preferably 0.01% or less.

When the total content of alkali earth metal oxides, that is, MgO+CaO+SrO+BaO (hereinafter also referred to as "RO") is low, the devitrification temperature increases, that is, the devitrification viscosity decreases, so that formability deteriorates. Therefore, RO is set at 18% or higher.

When RO is too rich, the average coefficient of thermal expansion may increase, and resistance to acid deteriorates. Therefore, RO is 22% or lower, preferably 21.5% or lower, more preferably 21% or lower, even more preferably 20.7% or lower, particularly preferably 20.5% or lower, and most preferably 20.3% or lower.

A small proportion of the MgO content to the CaO content, that is, a small ratio MgO/CaO accelerates precipitation of $CaO-Al_2O_3-S_iO_2$ based crystals to thereby deteriorate the formability. Specifically, the devitrification temperature increases, that is, the devitrification viscosity decreases. Therefore, MgO/CaO is 0.8 or higher, preferably 0.85 or higher, more preferably 0.9 or higher, and even more preferably 0.92 or higher. However, when MgO/CaO is too high, $MgO-Al_2O_3-SiO_2$ based crystals are precipitated easily so that the devitrification temperature increases, that is, the devitrification viscosity decreases. Therefore, MgO/CaO is 1.33 or lower, preferably 1.3 or lower, more preferably 1.25 or lower, even more preferably 1.2 or lower, particularly preferably 1.1 or lower, most preferably 1.05 or lower.

Alkali metal oxides such as $Li_2O$, $Na_2O$ and $K_2O$ are substantially not contained in the alkali free glass according to the embodiment. When alkali metal oxides are substantially not contained in the embodiment, the total content of the alkali metal oxides is, for example, 0.5% or lower, preferably 0.2% or lower, more preferably 0.1% or lower, further more preferably 0.08% or lower, even more preferably 0.05% or lower, and most preferably 0.03% or lower.

When an alkali free glass sheet is used for manufacturing a display, it is preferable that $P_2O_5$ is substantially not contained in the alkali free glass according to the present invention, in order to prevent deterioration in properties of a thin film of metal, oxide or the like provided on the surface of the glass sheet. In the embodiment, when $P_2O_5$ is substantially not contained, the content of $P_2O_5$ is, for example, 0.1% or lower. Further, in order to recycle the glass easily, it is preferable that PbO, $As_2O_3$ and $Sb_2O_3$ are substantially not contained in the alkali free glass according to the embodiment. In the embodiment, when PbO, $As_2O_3$ and $Sb_2O_3$ are substantially not contained, the content of each of PbO, $As_2O_3$ and $Sb_2O_3$ is, for example, 0.01% or lower, and preferably 0.005% or lower.

In order to improve the meltability, refining property, formability, etc. of the glass, the alkali free glass according to the embodiment may contain one or more kinds of $ZrO_2$, ZnO, $Fe_2O_3$, $SO_3$, F, Cl and $SnO_2$ by 2% or lower, preferably 1% or lower, and more preferably 0.5% or lower in total. F is a component which improves the meltability and refining property of the glass. When F is contained in the alkali free glass according to the embodiment, the content of F is preferably 1.5% or lower (0.43 mass % or lower). $SnO_2$ is a component which also improves the meltability and refining property of the glass. When $SnO_2$ is contained in the alkali free glass according to the embodiment, the content of $SnO_2$ is preferably 0.5% or lower (1.1 mass % or lower).

A β-OH value of the alkali free glass according to the present invention is preferably 0.05 to 0.5 $mm^{-1}$.

The β-OH value is an index of the amount of moisture contained in the glass. For a glass sample, absorbance against a light of a wavelength of 2.75 to 2.95 μm is measured, and a maximum value $β_{max}$ of the measured absorbance is divided by the thickness (mm) of the sample. Thus, the β-OH value is obtained. When the β-OH value is 0.5 $mm^{-1}$ or lower, compaction that is described later can be attained easily. The β-OH value is more preferably 0.45 $mm^{-1}$ or lower, more preferably 0.4 $mm^{-1}$ or lower, further more preferably 0.35 $mm^{-1}$ or lower, even more preferably 0.3 $mm^{-1}$ or lower, particularly preferably 0.28 $mm^{-1}$ or lower, and most preferably 0.25 $mm^{-1}$ or lower. On the other hand, when the β-OH value is 0.05 $mm^{-1}$ or higher, a strain point of a glass which is described later can be attained easily. The β-OH value is more preferably 0.08 $mm^{-1}$ or higher, further more preferably 0.1 $mm^{-1}$ or higher, even more preferably 0.13 mm$^{-1}$ or higher, particularly preferably 0.15 mm$^{-1}$ or higher, and most preferably 0.18 mm$^{-1}$ or higher.

In the alkali free glass according to the embodiment, a value expressed by the following Expression (I) is preferably 4.10 or more.

$$(7.87[Al_2O_3]-8.5[B_2O_3]+11.35[MgO]+7.09[CaO]+ 5.52[SrO]-1.45[BaO])/[SiO_2] \qquad \text{Expression (I)}$$

The value expressed by Expression (I) is an index of the Young's modulus. When the value is less than 4.10, the Young's modulus is reduced. In the alkali free glass according to the embodiment, the value expressed by Expression (I) is more preferably 4.15 or more, even more preferably 4.2 or more, particularly preferably 4.25 or more, and most preferably 4.3 or more.

In the aforementioned Expression (I), [Al$_2$O$_3$], [B$_2$O$_3$], [MgO], [CaO], [SrO], [BaO] and [SiO$_2$] represent the contents of Al$_2$O$_3$, B$_2$O$_3$, MgO, CaO, SrO, BaO and SiO$_2$ as represented by mol % based on oxides, respectively. The same thing can be applied to the following Expressions (II) and (III).

In the alkali free glass according to the embodiment, a value expressed by the following Expression (II) is preferably 0.95 or more.

$$(-1.02[Al_2O_3]+10.79[B_2O_3]+2.84[MgO]+4.12 [CaO]+5.19[SrO]+3.16[BaO])/[SiO_2] \qquad \text{Expression (II)}$$

The value expressed by Expression (II) is an index of the strain point. When the value is less than 0.95, the strain point is increased. In the alkali free glass according to the embodiment, the value expressed by Expression (II) is more preferably 1.0 or more, even more preferably 1.05 or more, and particularly preferably 1.1 or more.

In the alkali free glass according to the embodiment, a value expressed by the following Expression (III) is preferably 5.5 or less.

$$(8.9[Al_2O_3]+4.26[B_2O_3]+11.3[MgO]+4.54[CaO]+0.1 [SrO]-9.98[BaO])\times\{1+([MgO]/[CaO]-1)^2\}/ [SiO_2] \qquad \text{Expression (III)}$$

The value expressed by Expression (III) is an index of the glass surface devitrification viscosity ($\eta_c$). When the value exceeds 5.5, the glass surface devitrification viscosity ($\eta_c$) is reduced. In the alkali free glass according to the embodiment, the value expressed by Expression (III) is more preferably 5.1 or less, even more preferably 4.8 or less, particularly preferably 4.5 or less, and most preferably 4.3 or less.

In the alkali free glass according to the embodiment, the average coefficient of thermal expansion at 50 to 350° C. is 30×10$^{-7}$/° C. or higher. For example, in manufacturing of a TFT-side substrate of a flat panel display, a gate metal film of copper or the like and a gate insulating film of silicon nitride or the like may be laminated sequentially on the alkali free glass substrate. In this case, when the average coefficient of thermal expansion at 50 to 350° C. is lower than 30×10$^{-7}$/° C., the difference in thermal expansion between the glass and the gate metal film of copper or the like formed on the surface of the substrate increases so that there may arise such a problem that the substrate is warped or the film is separated.

The average coefficient of thermal expansion at 50 to 350° C. is preferably 33×10$^{-7}$/° C. or higher, more preferably 35×10$^{-7}$/° C. or higher, even more preferably 36×10$^{-7}$/° C. or higher, particularly preferably 37×10$^{-7}$/° C. or higher, and most preferably 38×10$^{-7}$/° C. or higher.

On the other hand, when the average coefficient of thermal expansion at 50 to 350° C. is higher than 43×10$^{-7}$/° C., the glass may be cracked in a step of manufacturing a product such as a display. Therefore, the average coefficient of thermal expansion at 50 to 350° C. is 43×10$^{-7}$/° C. or lower.

The average coefficient of thermal expansion at 50 to 350° C. is preferably 42×10$^{-7}$/° C. or lower, more preferably 41.5×10$^{-7}$/° C. or lower, even more preferably 41×10$^{-7}$/° C. or lower, particularly preferably 40.5×10$^{-7}$/° C. or lower, and most preferably 40.3×10$^{-7}$/° C. or lower.

The Young's modulus of the alkali free glass according to the embodiment is 88 GPa or more. Consequently, deformation of a substrate caused by external stress can be inhibited. For example, warpage of the substrate is inhibited when deposited on the surface of the glass substrate. As a specific example, in manufacturing of a TFT-side substrate of a flat panel display, the substrate can be inhibited from warping when a gate metal film of copper or the like or a gate insulating film of silicon nitride or the like is formed on the surface of the substrate. For example, deflection of the substrate when the substrate increases in size can be also inhibited. The Young's modulus is preferably 88.5 GPa or more, more preferably 89 GPa or more, even more preferably 89.5 GPa or more, particularly preferably 90 GPa or more, and most preferably 90.5 GPa or more. The Young's modulus can be measured by an ultrasonic method.

The strain point of the alkali free glass according to the embodiment is 650 to 725° C. When the strain point is lower than 650° C., a glass sheet exposed to high temperature in a step of forming a thin film on a display tends to be deformed and contracted (thermally contracted) due to structural stabilization of the glass. The strain point is preferably 685° C. or higher, more preferably 690° C. or higher, even more preferably 693° C. or higher, particularly preferably 695° C. or higher, and most preferably 698° C. or higher. On the other hand, when the strain point is too high, it is necessary to increase the temperature of a slow cooling apparatus in accordance with the strain point. Thus, the life of the slow cooling apparatus tends to be reduced. The strain point is preferably 723° C. or lower, more preferably 720° C. or lower, even more preferably 718° C. or lower, particularly preferably 716° C. or lower, and most preferably 714° C. or lower.

In the alkali free glass according to the embodiment, a temperature $T_4$ at which the viscosity reaches 10$^4$ dPa·s is 1,290° C. or lower. Consequently, the alkali free glass according to the embodiment is excellent in formability. In addition, for example, the temperature at which the glass according to the embodiment is formed can be decreased so that volatile components in the atmosphere around the glass can be reduced to thereby reduce defects. Further, since the glass can be formed at a low temperature, a load on manufacturing facilities can be reduced. For example, the life of a float bath or the like for forming the glass can be elongated so that productivity can be improved. $T_4$ is preferably 1,287° C. or lower, more preferably 1,285° C. or lower, even more preferably 1,283° C. or lower, and particularly preferably 1,280° C. or lower.

$T_4$ can be obtained as a temperature at which viscosity measured by use of a rotary viscometer reaches 10$^4$ dPa·s according to a method specified under ASTM C 965-96. In Examples which are described later, NBS710 and NIST717a were used as reference samples for calibration of apparatus.

In the alkali free glass according to the embodiment, a glass surface devitrification temperature ($T_c$) is $T_4$+20° C. or lower. Consequently, the glass alkali free according to the embodiment is excellent in formability. In addition, transmittance can be inhibited from decreasing due to crystals generated inside the glass during forming. In addition, a load on manufacturing facilities can be reduced. For example, the life of a float bath or the like for forming the glass can be elongated so that productivity can be improved.

The glass surface devitrification temperature ($T_c$) is preferably $T_4+10°$ C. or lower, more preferably $T_4+5°$ C. or lower, even more preferably $T_4°$ C. or lower, particularly preferably $T_4-1°$ C. or lower, and most preferably $T_4-5°$ C. or lower.

The glass surface devitrification temperature ($T_c$) and a glass internal devitrification temperature ($T_d$) can be obtained as follows. That is, crushed glass particles are put into a dish made of platinum, and a heat treatment is performed thereon for 17 hours in an electric furnace controlled to a fixed temperature. After the heat treatment, a maximum temperature at which crystals are precipitated on the surface of the glass and a minimum temperature at which no crystals are precipitated likewise are measured by use of an optical microscope, and an average of those temperatures is regarded as the glass surface devitrification temperature ($T_c$). In the same manner, a maximum temperature at which crystals are precipitated inside the glass and a minimum temperature at which no crystals are precipitated likewise are measured, and an average of those temperatures is regarded as the glass internal devitrification temperature ($T_d$). Viscosity in each of the glass surface devitrification temperature ($T_c$) and a glass internal devitrification temperature ($T_d$) can be obtained by viscosity of the glass measured at the devitrification temperature.

The specific elastic modulus (Young's modulus (GPa)/density (g/cm$^3$)) of the alkali free glass according to the embodiment is preferably 34 MN·m/kg or higher. Consequently the glass has a reduced deflection by its own weight so that the glass can be handled easily even if it is formed into a large-sized substrate. The specific elastic modulus is more preferably 34.5 MN·m/kg or higher, even more preferably 34.8 MN·m/kg or higher, particularly preferably 35 MN·m/kg or higher, and most preferably 35.2 MN·m/kg or higher. The large-sized substrate is, for example, a substrate having at least one side of 1,800 mm or longer. At least one side of the large-sized substrate may be 2,000 mm or longer, or 2,500 mm or longer, 3,000 mm or longer, or 3,500 mm or longer.

The density of the alkali free glass according to the embodiment is preferably 2.60 g/cm$^3$ or lower. Consequently, the glass has a reduced deflection by its own weight so that the glass can be handled easily even if it is formed into a large-sized substrate. In addition, a device using the alkali free glass according to the embodiment can be reduced in weight. The density is more preferably 2.59 g/cm$^3$ or lower, even more preferably 2.58 g/cm$^3$ or lower, particularly preferably 2.57 g/cm$^3$ or lower, and most preferably 2.56 g/cm$^3$ or lower.

In the alkali free glass according to the embodiment, glass surface devitrification viscosity ($\eta_c$) which is viscosity at the glass surface devitrification temperature ($T_c$) is preferably $10^{3.8}$ dPa·s or higher. Consequently the glass is excellent in formability into a glass sheet. In addition, transmittance can be inhibited from decreasing due to crystals generated inside the glass during forming. In addition, a load on manufacturing facilities can be reduced. For example, the life of a float bath or the like for forming the glass can be elongated so that productivity can be improved. The glass surface devitrification viscosity ($\eta_c$) is more preferably $10^{3.85}$ dPa·s or higher, even more preferably $10^{3.9}$ dPa·s or higher, particularly preferably $10^4$ dPa·s or higher, and most preferably $10^{4.05}$ dPa·s or higher.

A temperature $T_2$ at which the viscosity of the glass according to the embodiment reaches $10^2$ dPa·s is preferably 1,680° C. or lower. Consequently the glass is excellent in meltability. In addition, a load on manufacturing facilities can be reduced. For example, the life of a furnace or the like for melting the glass can be elongated so that productivity can be improved. In addition, defects (such as spot defects or Zr defects) caused by the furnace can be reduced. $T_2$ is more preferably 1,670° C. or lower, even more preferably 1,660° C. or lower, particularly preferably 1,640° C. or lower, particularly preferably 1,635° C. or lower, and most preferably 1,625° C. or lower.

A glass transition temperature of the alkali free glass according to the embodiment is preferably 730 to 790° C. When the glass transition temperature is 730° C. or higher, the glass is excellent in formability. For example, a deviation in sheet thickness or waving in the surface can be reduced. On the other hand, when the strain point is 790° C. or lower, a load on manufacturing facilities can be reduced. For example, a surface temperature of a roll used for forming the glass can be reduced so that the life of facilities can be elongated, and the productivity can be improved. The glass transition temperature is more preferably 740° C. or higher, even more preferably 745° C. or higher, particularly preferably 750° C. or higher, and most preferably 755° C. or higher. On the other hand, the glass transition temperature is more preferably 785° C. or lower, even more preferably 783° C. or lower, particularly preferably 780° C. or lower, and most preferably 775° C. or lower.

In the alkali free glass according to the embodiment, compaction is preferably 100 ppm or lower, more preferably 90 ppm or lower, further more preferably 80 ppm or lower, even more preferably 75 ppm or lower, particularly preferably 70 ppm or lower, and most preferably 65 ppm or lower. The compaction is a glass thermal shrinkage generated by relaxation of a glass structure during a heat treatment. When the compaction is 100 ppm or lower, deformation of the glass and a dimensional change caused by structural stabilization of the glass can be suppressed and minimized when the glass is exposed to high temperature in a thin film forming step carried out in a process of manufacturing various displays.

The compaction in the embodiment means compaction measured in the following procedure.

A glass sheet sample (sample mirror-finished with cerium oxide and measuring 100 mm in length, 10 mm in width and 1 mm in thickness) obtained by processing the alkali free glass according to the embodiment is retained at a temperature of the glass transition temperature +120° C. for 5 minutes, and then cooled down to room temperature at a rate of 40° C. per minute. After the glass sheet sample has been cooled down to the room temperature, total length (lengthwise) L1 of the sample is measured. After that, the glass sheet sample is heated to 600° C. at a rate of 100° C. per hour, retained at 600° C. for 80 minutes, and cooled down to the room temperature at a rate of 100° C. per hour. After the glass sheet sample has been cooled down to the room temperature, total length L2 of the sample is measured again. A ratio (L1−L2)/L1 of a difference (L1−L2) in total length between before and after the heat treatment at 600° C. to the total length L1 of the sample before the heat treatment at 600° C. is regarded as a value of compaction.

In the alkali free glass according to the embodiment, for example, an equivalent cooling rate is set preferably at 500°

C./min or lower in order to reduce the compaction. The equivalent cooling rate is preferably 5° C./min or higher and 500° C./min or lower in terms of balance between the compaction and the productivity. In terms of the productivity, the equivalent cooling rate is more preferably 10° C./min or higher, even more preferably 15° C./min or higher, particularly preferably 20° C./min or higher, and most preferably 25° C./min or higher. In terms of the compaction, the equivalent cooling rate is more preferably 300° C./min or lower, even more preferably 200° C./min or lower, particularly preferably 150° C./min or lower, and most preferably 100° C./min or lower.

The equivalent cooling rate in the embodiment means an equivalent cooling rate measured in the following procedure.

The alkali free glass according to the embodiment is processed to obtain a plurality of samples for creating a calibration curve. Each sample has a rectangular parallelepiped shape measuring 10 mm by 10 mm by 1 mm. The samples prepared thus are retained for 5 minutes at the glass transition temperature +120° C. by use of an infrared heating electric furnace. After that, each sample is cooled down to 25° C. at a different cooling rate ranging from 1° C./min to 1,000° C./min. Next, a refractive index $n_d$ on d-line (wavelength 587.6 nm) is measured in each sample by a V-block method using a precision refractometer KPR-2000 made by Shimadzu Device Corporation. The value $n_d$ obtained in each sample is plotted for a logarithm of the cooling rate thereof. In this manner, a calibration curve of $n_d$ for the cooling rate is obtained.

Next, the alkali free glass according to the embodiment is processed into a rectangular parallelepiped shape measuring 10 mm by 10 mm by 1 mm, and $n_d$ is measured by the V-block method using the precision refractometer KPR-2000 made by Shimadzu Device Corporation. A cooling rate corresponding to the obtained $n_d$ is acquired from the calibration curve. The obtained cooling rate is regarded as the equivalent cooling rate.

The alkali free glass according to the embodiment has a high Young's modulus of 88 GPa or higher to thereby inhibit deformation of a substrate caused by external stress. Thus, the glass is suitable for a glass sheet to be used as a large-sized substrate. The large-sized substrate is, for example, a glass sheet having at least one side of 1,800 mm or longer. As a specific example, the substrate is a glass sheet which is 1,800 mm or longer in long sides and 1,500 mm or longer in short sides.

The alkali free glass according to the embodiment is used preferably as a glass sheet which has at least one side of 2,400 mm or longer, for example, which is 2,400 mm or longer in long sides and 2,100 mm or longer in short sides, more preferably as a glass sheet which has at least one side of 3,000 mm or longer, for example, which is 3,000 mm or longer in long sides and 2,800 mm or longer in short sides, particularly preferably as a glass sheet which has at least one side of 3,200 mm or longer, for example, which is 3,200 mm or longer in long sides and 2,900 mm or longer in short sides, and most preferably as a glass sheet which has at least one side of 3,300 mm or longer, for example, which is 3,300 mm or longer in long sides and 2,950 mm or longer in short sides.

The alkali free glass according to the embodiment is preferably 0.7 mm or less in thickness in terms of reduction in weight. The thickness of the alkali free glass according to the embodiment is more preferably 0.65 mm or less, even more preferably 0.55 mm or less, particularly preferably 0.45 mm or less, and most preferably 0.4 mm or less. Although the thickness may be set at 0.1 mm or less or 0.05 mm or less, the thickness is preferably 0.1 mm or more and more preferably 0.2 mm or more in terms of prevention of deflection by its own weight.

The alkali free glass according to the embodiment can be, for example, manufactured in the following procedure.

Raw materials for the glass are prepared to have an intended glass composition, thrown into a melting furnace, and heated to 1,500 to 1,800° C. to be thereby melted. Thus, a molten glass is obtained. The obtained molten glass is formed into a glass ribbon with a predetermined sheet thickness by a forming apparatus. The glass ribbon is gradually cooled down, and then cut. Thus, the alkali free glass is obtained.

In the manufacturing of the alkali free glass according to the embodiment, it is preferable that the glass is, for example, cooled down to set the equivalent cooling rate at 500° C./min or lower in order to reduce the compaction.

In the manufacturing of the alkali free glass according to the embodiment, it is preferable that the molten glass is formed into a glass sheet by a float process, a fusion process or the like. The float process is preferred in order to stably produce a large-sized sheet glass (for example, having one side of 1,800 mm or longer) with a high Young's modulus.

Next, a display panel according to the embodiment is described.

The display panel according to the embodiment includes the aforementioned alkali free glass according to the embodiment as a glass substrate. The display panel is not particularly limited as long as it includes the alkali free glass according to the embodiment. The display panel may be one of various display panels such as a liquid crystal display panel, an organic EL display panel, etc.

Description is made in a case of a thin film transistor liquid crystal display (TFT-LCD) by way of example. A gate electrode line and a gate insulating oxide layer are formed on the surface of the display. A display surface electrode substrate (array substrate) where pixel electrodes are formed and a color filter substrate where RGB color filters and opposed electrodes are formed are provided on the surface of the oxide layer. A liquid crystal material is put between the array substrate and the color filter substrate which are paired. In this manner, a cell is constituted. A liquid crystal display panel includes not only the cell but also other elements such as a peripheral circuit and so on. In the liquid crystal display panel according to the embodiment, the alkali free glass according to the embodiment is used as at least one of the paired substrates constituting the cell.

The alkali free glass according to the embodiment can be used as a glass sheet for supporting an electronic device. When the alkali free glass according to the embodiment is used as a glass sheet for supporting an electronic device, a device forming substrate such as a glass substrate, a silicon substrate or a resin substrate is laminated on the alkali free glass (glass sheet for supporting an electronic device) according to the embodiment directly or by use of a bonding material so that the device forming substrate can be supported. Examples of the glass sheet for supporting an electronic device include a supporting glass sheet in a process of manufacturing a flexible display (such as an organic EL display) using resin such as polyimide as a substrate, and a glass sheet for supporting a resin-silicon chip composite wafer in a process of manufacturing a semiconductor package.

Next, a semiconductor device according to the embodiment is described.

The semiconductor device according to the embodiment includes the aforementioned alkali free glass according to the embodiment as a glass substrate. Specifically the semiconductor device according to the embodiment includes the alkali free glass according to the embodiment as a glass substrate for an image sensor such as MEMS, CMOS or CIS. The semiconductor device according to the embodiment includes the alkali free glass according to the embodiment as a cover glass for a display device for a projection application, such as a cover glass for LCOS (Liquid Crystal On Silicon).

Next, an information recording medium according to the embodiment is described.

The information recording medium according to the embodiment includes the aforementioned alkali free glass according to the embodiment as a glass substrate. Specifically, examples of the information recording medium include a magnetic recording medium, an optical disk, etc. Examples of the magnetic recording medium include an energy-assisted magnetic recording medium and a vertical magnetic recording type magnetic recording medium.

Next, a planar antenna according to the embodiment is described.

The planar antenna according to the embodiment includes the aforementioned alkali free glass according to the embodiment as a glass substrate. Specifically, examples of the planar antenna include a plane liquid crystal antenna having a planar shape, such as a liquid crystal antenna or a microstrip antenna (patch antenna) as an antenna excellent in directivity and receiving sensitivity. Such a liquid crystal antenna is, for example, disclosed in WO 2018/016398. Such a patch antenna is, for example, disclosed in JP-T-2017-509266 or JP-A-2017-063255.

Examples

Examples is described below, but the present invention is not limited to those examples. In the following description, Examples 1 to 12 and Examples 19 to 36 are working examples, and Examples 13 to 18 are comparative examples.

Raw materials for respective components were prepared to obtain each composition (unit: mol %) shown in Tables 1 to 6, and melted at 1,600° C. for 1 hour by use of a platinum crucible. After the melting, the obtained melt was poured onto a carbon plate, retained for 60 minutes at a temperature of the glass transition temperature +30° C., and cooled down to room temperature (25° C.) at a rate of 1° C. per minute. Thus, a sheet-like glass was obtained. The sheet-like glass was mirror-finished to obtain a glass sheet, various physical properties of which were measured. Results are shown in Tables 1 to 6. In Tables 1 to 6, each value in parenthesis is a calculated value, and each black designates an unmeasured item.

Methods for measuring the respective physical properties are shown below.
(Average Coefficient of Thermal Expansion)
Measurement was performed by use of a differential thermal expansion meter (TMA) according to a method specified under JIS R3102 (1995). A measuring temperature range was set as a range of from room temperature to 400° C. or higher, and an average coefficient of thermal expansion at 50 to 350° C. was expressed by unit of $10^{-7}/°$ C.
(Density)
Density of about 20 g of a glass block including no bubbles was measured by an Archimedes method according to a method specified under JIS Z 8807.
(Strain Point)
A strain point was measured by a fiber drawing method according to a method specified under JIS R3103-2 (2001).
(Glass Transition Temperature Tg)
A glass transition temperature Tg was measured by a thermal expansion method according to a method specified under JIS R3103-3 (2001).
(Young's Modulus)
Young's modulus was measured for a glass 0.5 to 10 mm thick by an ultrasonic method according to a method specified under JIS Z 2280.
($T_2$)
Viscosity was measured by use of a rotary viscometer, and a temperature $T_2$ (° C.) at which the viscosity reached $10^2$ d·Pa·s was measured according to a method specified under ASTM C 965-96.
($T_4$)
Viscosity was measured by use of a rotary viscometer, and a temperature $T_4$ (° C.) at which the viscosity reached $10^4$ d·Pa·s was measured according to a method specified under ASTM C 965-96.
(Devitrification Temperature)
Each glass was crushed and classified into a particle size range of 2 to 4 mm by use of testing sieves.

A glass cullet obtained thus was ultrasonically cleaned in isopropyl alcohol for 5 minutes, washed with ion-exchanged water, then dried, put into a dish made of platinum, and subjected to a heat treatment for 17 hours in an electric furnace controlled to a fixed temperature. The temperature of the heat treatment was set stepwise at an interval of 10° C. After the heat treatment, the glass was extracted from the platinum dish. Maximum temperatures at which crystals were precipitated on the surface of the glass and inside the glass and minimum temperatures at which no crystals were precipitated likewise were measured by use of an optical microscope. Each of the maximum temperatures at which crystals were deposited on the surface of the glass and inside the glass and the minimum temperatures at which no crystals were deposited likewise was measured once (or twice when precipitation of crystals could not be determined easily). An average value of the maximum temperature at which crystals were deposited on the surface of the glass and the minimum temperature at which no crystals were deposited likewise was obtained and regarded as a glass surface devitrification temperature ($T_c$). In the same manner, an average value of the maximum temperature at which crystals were deposited inside the glass and the minimum temperature at which no crystals were deposited likewise was obtained and regarded as a glass internal devitrification temperature ($T_d$).
(Specific Elastic Modulus)
The Young's modulus obtained in the aforementioned procedure was divided by the density. Thus, specific elastic modulus was obtained.
(Devitrification Viscosity)
The glass surface devitrification temperature ($T_c$) was obtained in the aforementioned method, and viscosity of the glass at the glass surface devitrification temperature ($T_c$) was measured and regarded as glass surface devitrification viscosity ($\eta_c$). In the same manner, the glass internal devitrification temperature ($T_d$) was obtained, and viscosity of the glass at the glass internal devitrification temperature ($T_d$) was measured and regarded as glass internal devitrification viscosity ($\eta_d$). [Table 1]

TABLE 1

|  | Ex. 1 | Ex. 2 | Ex. 3 | Ex. 4 | Ex. 5 | Ex. 6 |
|---|---|---|---|---|---|---|
| $SiO_2$ | 65.2 | 65.2 | 65.2 | 65.2 | 65.2 | 65.2 |
| $Al_2O_3$ | 13.5 | 13.5 | 13.5 | 13.8 | 13.8 | 13.8 |
| $B_2O_3$ | 1.2 | 1.2 | 1.2 | 1.2 | 1.2 | 1.2 |
| MgO | 9.5 | 9.2 | 8.9 | 8.9 | 9.2 | 8.6 |
| CaO | 10.0 | 9.7 | 9.4 | 9.4 | 9.1 | 9.7 |
| SrO | 0.6 | 1.2 | 1.8 | 1.5 | 1.5 | 1.5 |
| BaO | 0 | 0 | 0 | 0 | 0 | 0 |
| RO | 20.1 | 20.1 | 20.1 | 19.8 | 19.8 | 19.8 |
| MgO/CaO | 0.95 | 0.95 | 0.95 | 0.95 | 1.01 | 0.89 |
| Value of Expression (I) | 4.27 | 4.23 | 4.20 | 4.21 | 4.23 | 4.19 |
| Value of Expression (II) | 1.08 | 1.10 | 1.11 | 1.08 | 1.08 | 1.09 |
| Value of Expression (III) | 4.28 | 4.20 | 4.13 | 4.17 | 4.19 | 4.18 |
| Average coefficient of thermal expansion ($\times 10^{-7}/°C.$) | 39.0 | 39.6 | 40.2 | 39.8 | 39.8 | 40.0 |
| Density ($g/cm^3$) | 2.54 | 2.55 | 2.56 | 2.55 | 2.55 | 2.55 |
| Strain point (° C.) | (722) | 712 | 715 | 718 | 717 | 716 |
| Glass transition temperature (° C.) | 781 | 768 | 768 | 770 | 771 | 770 |
| Young's modulus (GPa) | 91.3 | 92.0 | 90.8 | 90.3 | 90.3 | 90.1 |
| $T_2$ (° C.) | 1611 | 1616 | 1617 | 1610 | 1610 | 1610 |
| $T_4$ (° C.) | 1276 | 1279 | 1279 | 1276 | 1276 | 1276 |
| $T_c$ (° C.) | 1275 | 1275 | 1265 | 1275 | 1265 | 1275 |
| $T_d$ (° C.) | <1270 | <1270 | <1260 | <1260 | <1260 | 1265 |
| $\eta_c$ (dPa·s) | $10^{4.01}$ | $10^{4.03}$ | $10^{4.12}$ | $10^{4.01}$ | $10^{4.10}$ | $10^{4.01}$ |
| $\eta_d$ (dPa·s) | $>10^{4.05}$ | $>10^{4.07}$ | $>10^{4.16}$ | $>10^{4.14}$ | $>10^{4.14}$ | $>10^{4.09}$ |
| Specific elastic modulus (MNm/kg) | 35.9 | 36.0 | 35.4 | 35.4 | 35.4 | 35.3 |

TABLE 2

|  | Ex. 7 | Ex. 8 | Ex. 9 | Ex. 10 | Ex. 11 | Ex. 12 |
|---|---|---|---|---|---|---|
| $SiO_2$ | 64.8 | 64.8 | 63.2 | 63.2 | 65.2 | 65.2 |
| $Al_2O_3$ | 14.2 | 14.2 | 15.5 | 15.5 | 13.5 | 13.5 |
| $B_2O_3$ | 1.2 | 1.2 | 1.2 | 1.2 | 1.2 | 1.2 |
| MgO | 9.0 | 8.6 | 10.0 | 9.2 | 9.5 | 10.1 |
| CaO | 9.0 | 9.4 | 8.3 | 9.1 | 8.8 | 8.2 |
| SrO | 1.8 | 1.8 | 1.8 | 1.8 | 1.8 | 1.8 |
| BaO | 0 | 0 | 0 | 0 | 0 | 0 |
| RO | 19.8 | 19.8 | 20.1 | 20.1 | 20.1 | 20.1 |
| MgO/CaO | 1.00 | 0.91 | 1.20 | 1.01 | 1.08 | 1.23 |
| Value of Expression (I) | 4.28 | 4.26 | 4.65 | 4.60 | 4.24 | 4.28 |
| Value of Expression (II) | 1.09 | 1.10 | 1.09 | 1.11 | 1.10 | 1.09 |
| Value of Expression (III) | 4.23 | 4.22 | 4.85 | 4.57 | 4.21 | 4.47 |
| Average coefficient of thermal expansion ($\times 10^{-7}/°C.$) | 39.6 | 40.2 | 39.5 | 40.1 | 40.5 | 39.5 |
| Density ($g/cm^3$) | 2.56 | 2.56 | 2.58 | 2.58 | 2.56 | 2.56 |
| Strain point (° C.) | 715 | 716 | 720 | 720 | 710 | 711 |
| Glass transition temperature (° C.) | 770 | 772 | 774 | 775 | 767 | 767 |
| Young's modulus (GPa) | 90.0 | 89.7 | 91.5 | 91.6 | 89.8 | 90.3 |
| $T_2$ (° C.) | 1611 | 1610 | 1577 | 1583 | 1613 | 1613 |
| $T_4$ (° C.) | 1277 | 1278 | 1258 | 1263 | 1276 | 1276 |
| $T_c$ (° C.) | 1285 | 1275 | 1265 | 1275 | 1265 | 1265 |
| $T_d$ (° C.) | <1280 | <1270 | <1260 | <1260 | <1260 | <1250 |
| $\eta_c$ (dPa·s) | $10^{3.94}$ | $10^{4.02}$ | $10^{3.94}$ | $10^{3.90}$ | $10^{4.09}$ | $10^{4.09}$ |
| $\eta_d$ (dPa·s) | $>10^{3.98}$ | $>10^{4.06}$ | $>10^{3.99}$ | $>10^{4.03}$ | $>10^{4.13}$ | $>10^{4.13}$ |
| Specific elastic modulus (MNm/kg) | 35.1 | 35.0 | 35.5 | 35.5 | 35.1 | 35.3 |

TABLE 3

|  | Ex. 13 | Ex. 14 | Ex. 15 | Ex. 16 | Ex. 17 | Ex. 18 |
|---|---|---|---|---|---|---|
| $SiO_2$ | 66.6 | 65.6 | 65.7 | 61.9 | 68.4 | 64.3 |
| $Al_2O_3$ | 12.1 | 12.4 | 15.9 | 10.2 | 11.0 | 15.5 |
| $B_2O_3$ | 3.7 | 2.7 | 0 | 0 | 0 | 0 |
| MgO | 7.6 | 10.9 | 8.0 | 14.2 | 10.0 | 15.7 |
| CaO | 5.2 | 8.4 | 10.4 | 13.7 | 10.6 | 4.5 |
| SrO | 4.8 | 0 | 0 | 0 | 0 | 0 |
| BaO | 0 | 0 | 0 | 0 | 0 | 0 |

TABLE 3-continued

|  | Ex. 13 | Ex. 14 | Ex. 15 | Ex. 16 | Ex. 17 | Ex. 18 |
|---|---|---|---|---|---|---|
| RO | 17.5 | 19.4 | 18.4 | 27.9 | 20.6 | 20.2 |
| MgO/CaO | 1.45 | 1.30 | 0.77 | 1.04 | 0.95 | 3.48 |
| Value of Expression (I) | 3.20 | 3.94 | 4.41 | 5.47 | 4.02 | 5.17 |
| Value of Expression (II) | 1.43 | 1.26 | 0.75 | 1.40 | 0.89 | 0.74 |
| Value of Expression (III) | 4.22 | 4.71 | 4.47 | 5.07 | 3.80 | 37.35 |
| Average coefficient of thermal expansion ($\times 10^{-7}/°C$) | (38) | 40.0 | (38) | 47.0 | (37) | (35) |
| Density (g/cm$^3$) | (2.56) | 2.50 | 2.54 | 2.60 | (2.55) | 2.55 |
| Strain point (°C.) | (698) | (710) | (761) | (704) | (731) | (744) |
| Glass transition temperature (°C.) | (726) | 761 | (811) | 764 | (800) | (797) |
| Young's modulus (GPa) | (84.6) | 89.3 | 92.2 | 92.7 | (89.7) | 95.4 |
| $T_2$ (°C.) | (1647) | 1615 | 1629 | (1523) | (1612) | (1589) |
| $T_4$ (°C.) | (1297) | 1272 | 1301 | (1205) | (1253) | (1268) |
| $T_c$ (°C.) | — | (1350) | — | (1210) | — | (>1310) |
| $T_d$ (°C.) | — | — | — | — | — | — |
| $\eta_c$ (dPa·s) | — | — | — | — | — | — |
| $\eta_d$ (dPa·s) | — | — | — | — | — | — |
| Specific elastic modulus (MNm/kg) | (33.0) | 35.7 | 36.3 | 35.7 | 35.2 | 37.4 |

TABLE 4

|  | Ex. 19 | Ex. 20 | Ex. 21 | Ex. 22 | Ex. 23 | Ex. 24 |
|---|---|---|---|---|---|---|
| SiO$_2$ | 64.5 | 63.8 | 63.5 | 64.0 | 64.3 | 65.0 |
| Al$_2$O$_3$ | 14.2 | 14.2 | 16.0 | 15.5 | 15.5 | 12.8 |
| B$_2$O$_3$ | 2.2 | 2.8 | 2.2 | 2.0 | 1.2 | 0.5 |
| MgO | 9.5 | 9.7 | 9.0 | 8.0 | 7.5 | 11.0 |
| CaO | 7.5 | 7.9 | 8.0 | 8.0 | 8.3 | 9.7 |
| SrO | 2.1 | 1.6 | 1.3 | 2.5 | 3.2 | 1.0 |
| BaO | 0 | 0 | 0 | 0 | 0 | 0 |
| RO | 19.1 | 19.2 | 18.3 | 18.5 | 19.0 | 21.7 |
| MgO/CaO | 1.27 | 1.23 | 1.13 | 1.00 | 0.90 | 1.13 |
| Value of Expression (I) | 4.12 | 4.12 | 4.30 | 4.16 | 4.25 | 4.55 |
| Value of Expression (II) | 1.21 | 1.32 | 1.14 | 1.16 | 1.08 | 1.06 |
| Value of Expression (III) | 4.61 | 4.68 | 4.64 | 4.27 | 4.17 | 4.46 |
| Average coefficient of thermal expansion ($\times 10^{-7}/°C$) | 38.7 | (38.6) | (37.3) | (38.8) | 39.8 | (40.9) |
| Density (g/cm$^3$) | 2.55 | (2.54) | (2.55) | (2.57) | 2.59 | (2.56) |
| Strain point (°C.) | 712 | (707) | (725) | (723) | 725 | (714) |
| Glass transition temperature (°C.) | 764 | (764) | (785) | (784) | 779 | (770) |
| Young's modulus (GPa) | 88.7 | (89.1) | (90.1) | (88.9) | 89.1 | (91.7) |
| $T_2$ (°C.) | 1610 | (1592) | (1594) | (1605) | 1616 | (1603) |
| $T_4$ (°C.) | 1268 | (1260) | (1269) | (1276) | 1278 | (1266) |
| $T_c$ (°C.) | 1285 | (≤1280) | (≤1289) | (≤1296) | (≤1298) | (≤1286) |
| $T_d$ (°C.) | (≤1285) | (≤1280) | (≤1289) | (≤1296) | (≤1298) | (≤1286) |
| $\eta_c$ (dPa·s) | $10^{3.87}$ | (≥$10^{3.8}$) | (≥$10^{3.8}$) | (≥$10^{3.8}$) | (≥$10^{3.8}$) | (≥$10^{3.8}$) |
| $\eta_d$ (dPa·s) | (≥$10^{3.87}$) | (≥$10^{3.8}$) | (≥$10^{3.8}$) | (≥$10^{3.8}$) | (≥$10^{3.8}$) | (≥$10^{3.8}$) |
| Specific elastic modulus (MNm/kg) | 34.7 | (35.0) | (35.3) | (34.6) | 34.4 | (35.8) |

TABLE 5

|  | Ex. 25 | Ex. 26 | Ex. 25 | Ex. 28 | Ex. 29 | Ex. 30 |
|---|---|---|---|---|---|---|
| SiO$_2$ | 65.0 | 64.5 | 65.0 | 64.8 | 64.3 | 64.3 |
| Al$_2$O$_3$ | 12.8 | 12.8 | 13.0 | 13.0 | 13.8 | 13.8 |
| B$_2$O$_3$ | 1.2 | 1.8 | 1.5 | 1.8 | 0.5 | 0.5 |
| MgO | 10.0 | 9.3 | 9.0 | 10.0 | 10.1 | 9.6 |
| CaO | 9.0 | 8.6 | 9.5 | 8.4 | 9.3 | 8.8 |
| SrO | 2.0 | 3.0 | 2.0 | 2.0 | 2.0 | 3.0 |
| BaO | 0 | 0 | 0 | 0 | 0 | 0 |
| RO | 21.0 | 20.9 | 20.5 | 20.4 | 21.4 | 21.4 |
| MgO/CaO | 1.11 | 1.08 | 0.95 | 1.19 | 1.09 | 1.09 |
| Value of Expression (I) | 4.29 | 4.16 | 4.16 | 4.18 | 4.60 | 4.55 |
| Value of Expression (II) | 1.17 | 1.30 | 1.20 | 1.23 | 1.07 | 1.10 |
| Value of Expression (III) | 4.25 | 4.15 | 4.12 | 4.39 | 4.41 | 4.29 |
| Average coefficient of thermal expansion ($\times 10^{-7}/°C$) | (41.1) | 41.9 | (41.1) | 40.6 | (41.6) | (42.3) |

TABLE 5-continued

|  | Ex. 25 | Ex. 26 | Ex. 25 | Ex. 28 | Ex. 29 | Ex. 30 |
|---|---|---|---|---|---|---|
| Density (g/cm³) | (2.57) | 2.58 | (2.56) | 2.56 | (2.58) | (2.60) |
| Strain point (° C.) | (709) | 704 | (709) | 706 | (722) | (722) |
| Glass transition temperature (° C.) | (765) | 754 | (766) | 758 | (777) | (778) |
| Young's modulus (GPa) | (89.9) | 87.9 | (89.0) | 88.4 | (91.2) | (90.8) |
| $T_2$ (° C.) | (1608) | 1608 | (1610) | 1611 | (1597) | (1599) |
| $T_4$ (° C.) | (1268) | 1261 | (1270) | 1265 | (1264) | (1266) |
| $T_c$ (° C.) | (≤1288) | (≤1281) | (≤1290) | 1265 | (≤1284) | (≤1286) |
| $T_d$ (° C.) | (≤1288) | (≤1281) | (≤1290) | (≤1265) | (≤1284) | (≤1286) |
| $\eta_c$ (dPa·s) | (≥10³·⁸) | (≥10³·⁸) | (≥10³·⁸) | 10⁴·⁰⁰ | (≥10³·⁸) | (≥10³·⁸) |
| $\eta_d$ (dPa·s) | (≥10³·⁸) | (≥10³·⁸) | (≥10³·⁸) | (≥10⁴·⁰⁰) | (≥10³·⁸) | (≥10³·⁸) |
| Specific elastic modulus (MNm/kg) | (35.0) | 34.1 | (34.7) | 34.6 | (35.3) | (35.0) |

TABLE 6

|  | Ex. 31 | Ex. 32 | Ex 33 | Ex. 34 | Ex. 35 | Ex. 36 |
|---|---|---|---|---|---|---|
| $SiO_2$ | 65.2 | 65.0 | 62.5 | 63.6 | 63.6 | 65.2 |
| $Al_2O_3$ | 13.8 | 14.5 | 16.0 | 13.0 | 13.0 | 14.0 |
| $B_2O_3$ | 1.5 | 1.5 | 0.7 | 1.5 | 1.7 | 1.2 |
| MgO | 9.2 | 9.1 | 11.0 | 12.1 | 9.2 | 8.6 |
| CaO | 8.2 | 7.7 | 8.8 | 9.2 | 11.2 | 7.5 |
| SrO | 1.8 | 2.0 | 1.0 | 0.6 | 1.3 | 3.5 |
| BaO | 0.3 | 0.2 | 0 | 0 | 0 | 0 |
| RO | 19.5 | 19.0 | 20.8 | 21.9 | 21.7 | 19.6 |
| MgO/CaO | 1.12 | 1.18 | 1.25 | 1.32 | 0.82 | 1.15 |
| Value of Expression (I) | 4.11 | 4.15 | 5.00 | 4.65 | 4.38 | 4.14 |
| Value of Expression (II) | 1.11 | 1.08 | 1.02 | 1.23 | 1.32 | 1.11 |
| Value of Expression (III) | 4.17 | 4.31 | 5.27 | 5.20 | 4.51 | 4.09 |
| Average coefficient of thermal expansion (×10⁻⁷/° C.) | (39.6) | (38.9) | (39.7) | (40.5) | (42.6) | (40.6) |
| Density (g/cm³) | (2.56) | (2.56) | (2.57) | (2.55) | (2.57) | (2.58) |
| Strain point (° C.) | (719) | (721) | (724) | (709) | (708) | (721) |
| Glass transition temperature (° C.) | (774) | (778) | (782) | (762) | (761) | (778) |
| Young's modulus (GPa) | (88.8) | (89.0) | (92.9) | (91.3) | (89.8) | (88.8) |
| $T_2$ (° C.) | (1622) | (1624) | (1577) | (1573) | (1580) | (1624) |
| $T_4$ (° C.) | (1279) | (1282) | (1255) | (1242) | (1245) | (1283) |
| $T_c$ (° C.) | (≤1299) | (≤1302) | (≤1275) | (≤1262) | (≤1265) | (≤1303) |
| $T_d$ (° C.) | (≤1299) | (≤1302) | (≤1275) | (≤1262) | (≤1265) | (≤1303) |
| $\eta_c$ (dPa·s) | (≥10³·⁸) | (≥10³·⁸) | (≥10³·⁸) | (≥10³·⁸) | (≥10³·⁸) | (≥10³·⁸) |
| $\eta_d$ (dPa·s) | (≥10³·⁸) | (≥10³·⁸) | (≥10³·⁸) | (≥10³·⁸) | (≥10⁴·⁰) | (≥10³·⁸) |
| Specific elastic modulus (MNm/kg) | (34.7) | (34.8) | (36.2) | (35.8) | (35.0) | (34.4) |

In Example 13 where $Al_2O_3$ was lower than 12.5%, $B_2O_3$ was higher than 30%, MgO was lower than 8%, CaO was lower than 60%, SrO was higher than 400 RO was lower than 18, and MgO/CaO was higher than 1.33, the Young's modulus was low to be lower than 88 GPa, and $T_4$ was high to be higher than 1,290° C. In Example 14 where $Al_2O_3$ was lower than 12.5%, and SrO was 0%, the glass surface devitrification temperature ($T_c$) was higher than $T_4$+20° C. In Example 15, Example 17 and Example 18 where the value of Expression (II) was less than 0.95, the strain point was high to be higher than 725° C. In Example 16 where $SiO_2$ was lower than 62%, $Al_2O_3$ was lower than 12.5%, MgO was higher than 13%, CaO was higher than 12%, SrO was 0%, and RO was higher than 22, the average coefficient of thermal expansion was large to be larger than 43×10⁻⁷/° C.

Although the present invention has been described in detail with reference to its specific embodiment, it is obvious for those in the art that various changes and modifications can be made without departing from the spirit and scope of the present invention. All the references cited herein are incorporated as a whole.

INDUSTRIAL APPLICABILITY

An alkali free glass according to the present invention characterized as described above is suitable for applications such as a substrate for a display, a substrate for a photomask, a substrate for supporting an electronic device, a substrate for an information recording medium, and a substrate for a planar antenna.

The invention claimed is:
1. An alkali free glass
   comprising $SiO_2$ as a main component, $Al_2O_3$, and $B_2O_3$,
   wherein the alkali free glass comprises, as represented by mol % based on oxides:
   62 to 67% of $SiO_2$,
   9 to 13% of MgO,
   6 to 12% of CaO,
   0.5 to 2.5% of SrO, and
   0 to 0.5% of BaO,
   wherein MgO/CaO is 1.1 or more,
   wherein the alkali free glass has a value expressed by the following Expression (I) of 4.6 or less:

$$(7.87[Al_2O_3]-8.5[B_2O_3]+11.35[MgO]+7.09[CaO]+5.52[SrO]-1.45[BaO])/[SiO_2] \quad \text{Expression (I)}$$

wherein the alkali free glass has a value expressed by the following Expression (II) of 1.06 to 1.32:

$$(-1.02[Al_2O_3]+10.79[B_2O_3]+2.84[MgO]+4.12[CaO]+5.19[SrO]+3.16[BaO])/[SiO_2] \quad \text{Expression (II)}$$

wherein the alkali free glass has a value expressed by the following Expression (III) of 4.09 to 4.8:

$$(8.9[Al_2O_3]+4.26[B_2O_3]+11.3[MgO]+4.54[CaO]+0.1[SrO]-9.98[BaO])\times\{1+([MgO]/[CaO]-1)^2\}/[SiO_2] \quad \text{Expression (III).}$$

2. The alkali free Glass according to claim 1, having a glass specific elastic modulus of 34 MN·m/kg or higher.

3. The alkali free glass according to claim 1, having a density of 2.60 g/cm$^3$ or lower.

4. The alkali free glass according to claim 1, having a glass surface devitrification viscosity ($\eta_c$) of $10^{3.8}$ dPa·s or higher.

5. The alkali free glass according to claim 1, having a glass transition temperature of 730 to 790° C.

6. The alkali free glass according to claim 1, comprising 0.5% or lower of SnO$_2$ as represented by mol % based on oxides.

7. The alkali free glass according to claim 1, having a β-OH value of 0.05 to 0.5 mm$^{-1}$.

8. The alkali free glass according to claim 1, having a compaction of 100 ppm or lower.

9. The alkali free glass according to claim 1, having an equivalent cooling rate of 5 to 500° C./min.

10. The alkali free glass according to claim 1, which is a glass sheet having at least one side of 1,800 mm or longer and a thickness of 0.7 mm or less.

11. The alkali free glass according to claim 10, which is manufactured by a float process or a fusion process.

12. A display panel comprising the alkali free glass according to claim 1.

13. A semiconductor device comprising the alkali free glass according to claim 1.

14. An information recording medium comprising the alkali free glass according to claim 1.

15. A planar antenna comprising the alkali free glass according to claim 1.

16. The alkali free glass according to claim 1, wherein MgO+CaO+SrO+BaO is 18 to 22%.

17. The alkali free glass according to claim 1, wherein the value expressed by the Expression (II) is 1.17 or more.

18. The alkali free glass according to claim 1, wherein the value expressed by the Expression (III) is 4.61 or less.

* * * * *